US012615624B2

(12) United States Patent
Kurita et al.

(10) Patent No.: US 12,615,624 B2
(45) Date of Patent: Apr. 28, 2026

(54) TERMINAL FOR PERFORMING REPETITION TRANSMISSION OF AN UPLINK SIGNAL USING AN UPLINK SHARED CHANNEL FOR A REPETITION TRANSMISSION TYPE A OF THE UPLINK SHARED CHANNEL

(71) Applicant: NTT DOCOMO, INC., Tokyo (JP)

(72) Inventors: Daisuke Kurita, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 398 days.

(21) Appl. No.: 18/040,589

(22) PCT Filed: Aug. 6, 2020

(86) PCT No.: PCT/JP2020/030259
§ 371 (c)(1),
(2) Date: Feb. 3, 2023

(87) PCT Pub. No.: WO2022/029972
PCT Pub. Date: Feb. 10, 2022

(65) Prior Publication Data
US 2024/0260009 A1 Aug. 1, 2024

(51) Int. Cl.
*H04J 3/00* (2006.01)
*H04L 1/08* (2006.01)
(Continued)

(52) U.S. Cl.
CPC .......... *H04W 72/0446* (2013.01); *H04J 3/00* (2013.01); *H04L 1/08* (2013.01); *H04L 1/16* (2013.01);
(Continued)

(58) Field of Classification Search
CPC ....... H04L 1/1812; H04L 47/76; H04L 47/78; H04L 1/16; H04L 27/26132;
(Continued)

(56) References Cited

U.S. PATENT DOCUMENTS

2013/0044693 A1* 2/2013 Lindh ................. H04W 74/006
370/329
2019/0230683 A1 7/2019 Akkarakaran et al.
(Continued)

FOREIGN PATENT DOCUMENTS

JP 2020065093 A 4/2020
JP 2020113881 A 7/2020
WO 2020026450 A1 2/2020

OTHER PUBLICATIONS

Office Action issued in Chinese Application No. 202080104607.8, dated Jun. 19, 2024 (12 pages).
(Continued)

*Primary Examiner* — Salvador E Rivas
(74) *Attorney, Agent, or Firm* — Osha Bergman Watanabe & Burton LLP

(57) ABSTRACT

Provided is a terminal including a transmission unit that performs repetition transmission of an uplink signal using an uplink channel, wherein the transmission unit performs the repetition transmission using specific slots that are nonconsecutive and allocated as transmission occasions for the repetition transmission.

7 Claims, 15 Drawing Sheets

(51) Int. Cl.

| | |
|---|---|
| *H04L 1/16* | (2023.01) |
| *H04L 1/1812* | (2023.01) |
| *H04L 5/00* | (2006.01) |
| *H04L 12/52* | (2006.01) |
| *H04L 27/26* | (2006.01) |
| *H04L 47/76* | (2022.01) |
| *H04L 47/78* | (2022.01) |
| *H04W 72/0446* | (2023.01) |
| *H04J 3/16* | (2006.01) |
| *H04W 72/231* | (2023.01) |

(52) U.S. Cl.

CPC .......... *H04L 1/1812* (2013.01); *H04L 5/0044* (2013.01); *H04L 12/52* (2013.01); *H04L 27/26132* (2021.01); *H04L 47/76* (2013.01); *H04L 47/78* (2013.01); *H04J 3/1694* (2013.01); *H04L 27/2613* (2013.01); *H04W 72/231* (2023.01)

(58) Field of Classification Search

CPC ... H04L 27/2643; H04L 5/0044; H04L 12/52; H04L 27/2613; H04J 3/00; H04J 3/1694; H04W 72/231

See application file for complete search history.

(56) References Cited

U.S. PATENT DOCUMENTS

| | | | | |
|---|---|---|---|---|
| 2020/0015224 | A1 | 1/2020 | Sano et al. | |
| 2020/0267756 | A1* | 8/2020 | Fakoorian | H04W 76/27 |
| 2020/0322948 | A1* | 10/2020 | Xue | H04J 3/02 |
| 2020/0351891 | A1* | 11/2020 | Hosseini | H04L 1/1819 |
| 2021/0120559 | A1* | 4/2021 | Li | H04L 1/08 |
| 2021/0329474 | A1* | 10/2021 | Si | H04L 5/0051 |
| 2022/0132489 | A1* | 4/2022 | Kim | H04L 5/0094 |
| 2022/0191903 | A1* | 6/2022 | Bae | H04L 1/08 |
| 2022/0256534 | A1* | 8/2022 | Lei | H04W 72/0446 |

OTHER PUBLICATIONS

Office Action issued in Japanese Application No. 2022-541057, dated Aug. 6, 2024 (8 pages).

Office Action issued in Chinese Patent Application No. 202080104607. 8, dated Jan. 27, 2025 (10 pages).

Office Action issued in Japanese Patent Application No. 2022-541057, dated Dec. 3, 2024 (6 pages).

3GPP TSG RAN WG1 #101; R1-2005004; Moderator (China Telecom); "[101-e-NR-Cov-Enh] Email discussion on evaluation methodology and simulation assumptions for NR coverage enhancements"; e-Meeting, May 25-Jun. 5, 2020 (157 pages).

3GPP TS 38.214 V16.2.0 "3rd Generation Partnership Project; Technical Specification Group Radio Access Network; NR; Physical layer procedures for data (Release 16)" Jun. 2020 (163 pages).

3GPP TSG RAN WG1 Meeting #93; R1-1805994 "UL SPS in LTE HRLLC" MediaTek Inc.; BuSan; South Korea; May 21-25, 2018 (5 pages).

3GPP TSG RAN Meeting #86; RP-193240 "New SID on NR coverage enhancement" China Telecom; Sitges, Spain; Dec. 9-12, 2019 (4 pages).

International Search Report issued in International Application No. PCT/JP2020/030259, mailed Mar. 23, 2021 (5 pages).

Written Opinion issued in International Application No. PCT/JP2020/030259; Dated Mar. 23, 2021 (4 pages).

* cited by examiner

Figure 4:
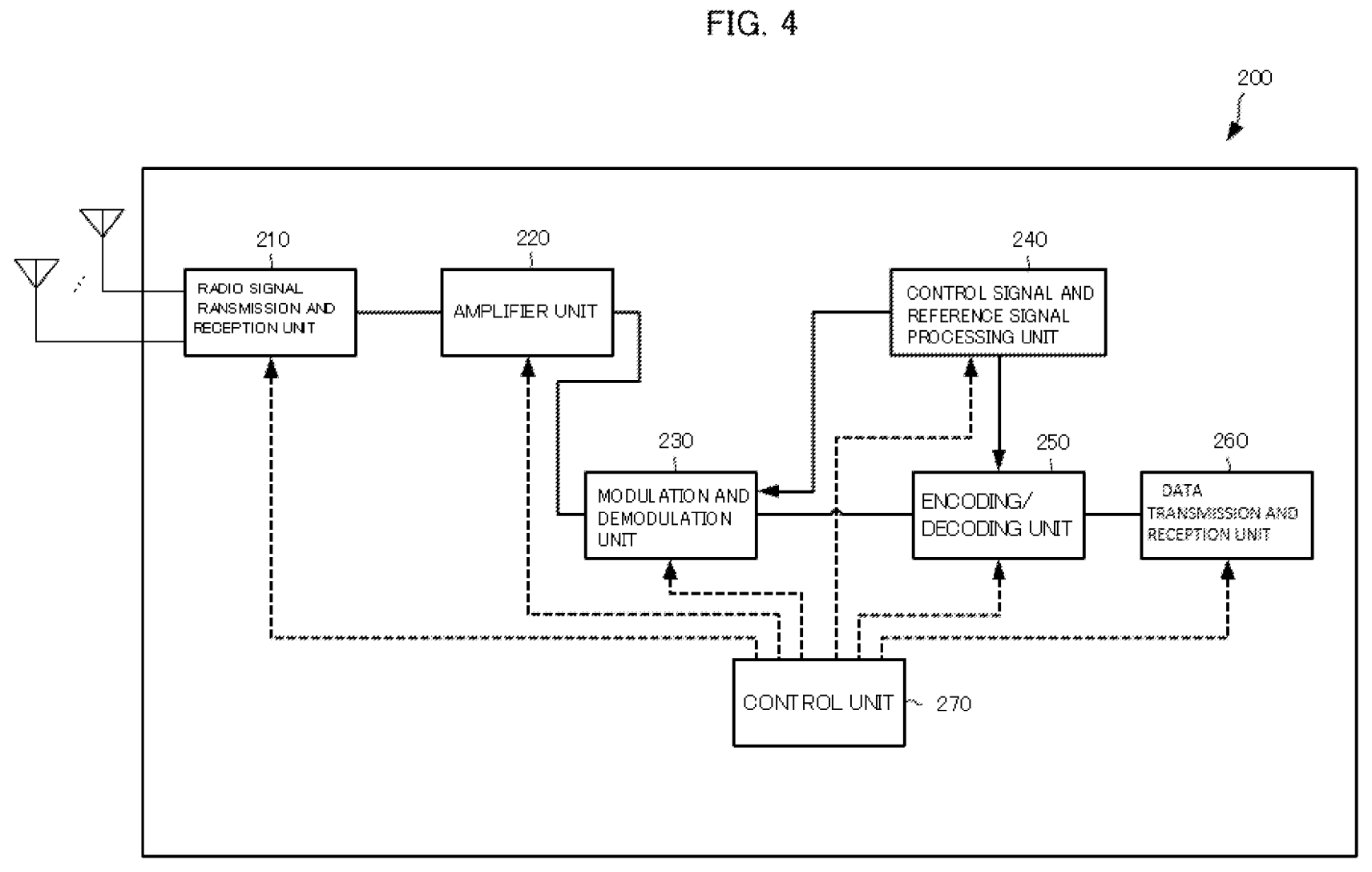

FIG.5
repetition Type A
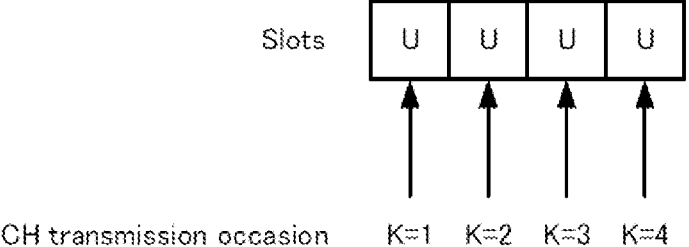
repetition Type B
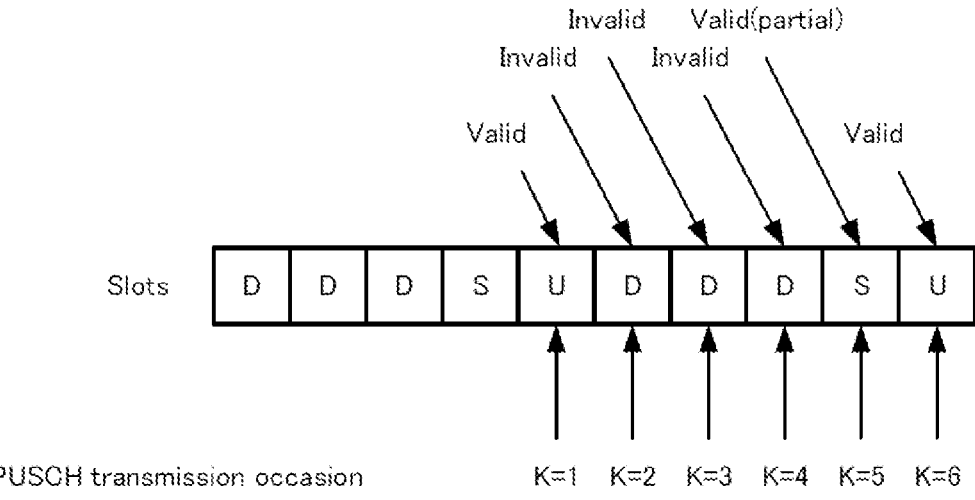

Figure 6:
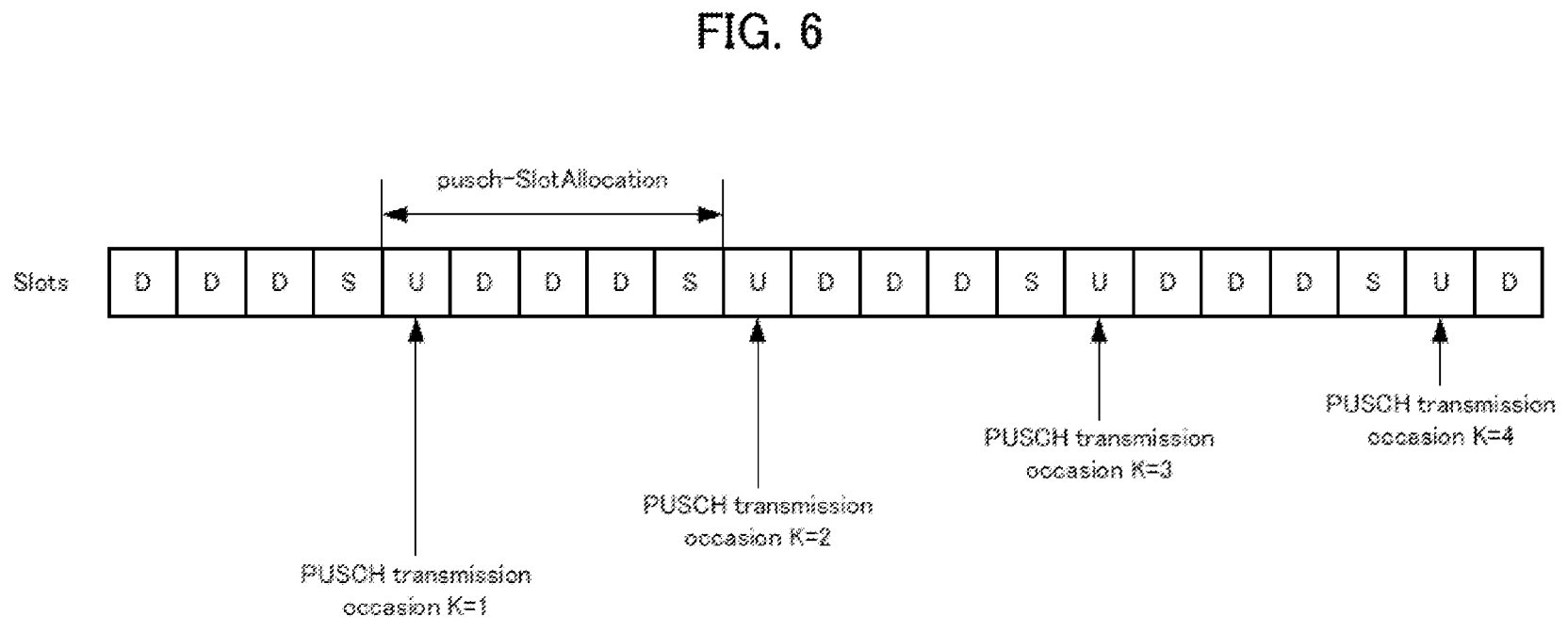

PUSCH-Config information element

```
-- ASN1START
-- TAG-PUSCH-CONFIG-START

PUSCH-Config ::=              SEQUENCE {
dataScramblingIdentityPUSCH          INTEGER (0..1023)                OPTIONAL,   -- Need S
txConfig                             ENUMERATED {codebook, nonCodebook}          OPTIONAL,   -- Need S
dmrs-UplinkForPUSCH-MappingTypeA     SetupRelease { DMRS-UplinkConfig }          OPTIONAL,   -- Need M
dmrs-UplinkForPUSCH-MappingTypeB     SetupRelease { DMRS-UplinkConfig }          OPTIONAL,   -- Need M
pusch-PowerControl                   PUSCH-PowerControl              OPTIONAL,   -- Need M
frequencyHopping                     ENUMERATED {intraSlot, interSlot}           OPTIONAL,   -- Need S
frequencyHoppingOffsetLists          SEQUENCE (SIZE (1..4)) OF INTEGER (1.. maxNrofPhysicalResourceBlocks-1)
                                                                     OPTIONAL,   -- Need M resourceAllocation                   ENUMERATED { resourceAllocationType0, resourceAllocationType1, dynamicSwitch},
pusch-TimeDomainAllocationList       SetupRelease { PUSCH-TimeDomainResourceAllocationList }
                                                                     OPTIONAL,   -- Need M pusch-AggregationFactor              ENUMERATED { n2, n4, n8 }       OPTIONAL,   -- Need S
pusch-SlotAllocation                 ENUMERATED { n1, n2, n3, n4 }   OPTIONAL,   -- Need S
mcs-Table                            ENUMERATED {qam256, qam64LowSE} OPTIONAL,   -- Need S
mcs-TableTransformPrecoder           ENUMERATED {qam256, qam64LowSE} OPTIONAL,   -- Need S
transformPrecoder                    ENUMERATED {enabled, disabled}  OPTIONAL,   -- Need S
codebookSubset                       ENUMERATED {fullyAndPartialAndNonCoherent, partialAndNonCoherent, nonCoherent}
                                                                     OPTIONAL,   -- Cond codebookBased maxRank                              INTEGER (1..4)                  OPTIONAL,   -- Cond codebookBased
rbg-Size                             ENUMERATED { config2}           OPTIONAL,   -- Need S
uci-OnPUSCH                          SetupRelease { UCI-OnPUSCH}     OPTIONAL,   -- Need M
tp-pi2BPSK                           ENUMERATED {enabled}            OPTIONAL,   -- Need S

PUSCH-Config information element

```
-- ASN1START
-- TAG-PUSCH-CONFIG-START

PUSCH-Config ::=                SEQUENCE {
    dataScramblingIdentityPUSCH     INTEGER (0..1023)                                                    OPTIONAL,   -- Need S
    txConfig                        ENUMERATED {codebook, nonCodebook}                                   OPTIONAL,   -- Need S
    dmrs-UplinkForPUSCH-MappingTypeA    SetupRelease { DMRS-UplinkConfig }                               OPTIONAL,   -- Need M
    dmrs-UplinkForPUSCH-MappingTypeB    SetupRelease { DMRS-UplinkConfig }                               OPTIONAL,   -- Need M
    pusch-PowerControl              PUSCH-PowerControl                                                   OPTIONAL,   -- Need M
    frequencyHopping                ENUMERATED {intraSlot, interSlot}                                    OPTIONAL,   -- Need S
    frequencyHoppingOffsetLists     SEQUENCE (SIZE (1..4)) OF INTEGER (1.. maxNrofPhysicalResourceBlocks-1)
                                                                                                         OPTIONAL,   -- Need M
    resourceAllocation              ENUMERATED { resourceAllocationType0, resourceAllocationType1, dynamicSwitch }
                                                                                                         OPTIONAL,   -- Need M
    pusch-TimeDomainAllocationList  SetupRelease { PUSCH-TimeDomainResourceAllocationList }
                                                                                                         OPTIONAL,   -- Need M
    pusch-AggregationFactor         ENUMERATED { n2, n4, n8 }                                            OPTIONAL,   -- Need M
    pusch-SlotDuration              ENUMERATED { n1, n2 }                                                OPTIONAL,   -- Need S
    mcs-Table                       ENUMERATED {qam256, qam64LowSE}                                      OPTIONAL,   -- Need S
    mcs-TableTransformPrecoder      ENUMERATED {qam256, qam64LowSE}                                      OPTIONAL,   -- Need S
    transformPrecoder               ENUMERATED {enabled, disabled}                                       OPTIONAL,   -- Need S
    codebookSubset                  ENUMERATED {fullyAndPartialAndNonCoherent, partialAndNonCoherent, nonCoherent}
                                                                                                         OPTIONAL,   -- Cond codebookBased
    maxRank                         INTEGER (1..4)                                                       OPTIONAL,   -- Cond codebookBased
    rbg-Size                        ENUMERATED { config2}                                                OPTIONAL,   -- Need S
    uci-OnPUSCH                     SetupRelease { UCI-OnPUSCH}                                           OPTIONAL,   -- Need M
    tp-pi2BPSK                      ENUMERATED {enabled}                                                 OPTIONAL,   -- Need S
    ...
}
```

TERMINAL FOR PERFORMING REPETITION TRANSMISSION OF AN UPLINK SIGNAL USING AN UPLINK SHARED CHANNEL FOR A REPETITION TRANSMISSION TYPE A OF THE UPLINK SHARED CHANNEL

TECHNICAL FIELD

The present disclosure relates to a terminal that performs radio communication, and more particularly to a terminal that transmits an uplink signal using an uplink channel.

BACKGROUND ART

The 3rd Generation Partnership Project (3GPP) specifies the 5th generation mobile communication system (also called 5G, New Radio (NR), or Next Generation (NG)) and has also specified a next generation called Beyond 5G, 5G Evolution, or 6G.

Release 15 and Release 16 (NR) of the 3GPP specify operations in a band including multiple frequency ranges, specifically FR1 (410 MHz to 7.125 GHZ) and FR2 (24.25 GHZ to 52.6 GHZ).

Release 17 of the 3GPP has discussed coverage enhancement in FR1 and FR2 (Non-Patent Literature 1). A corresponding improvement in channel quality is desirable for a PDSCH (Physical Downlink Shared Channel), a PUSCH (Physical Uplink Shared Channel), a PDCCH (Physical Downlink Control Channel), a PUCCH (Physical Uplink Control Channel), and the like.

Release 16 defines repetition Type A and repetition Type B as repetition types of repetition transmission of a signal using a PUSCH (hereinafter, PUSCH repetition transmission) (Non-Patent Literature 2).

CITATION LIST

Non-Patent Literature

[Non-Patent Literature 1]
　"New SID on NR coverage enhancement", RP-193240,
　　3GPP TSG RAN Meeting #86, 3GPP, December 2019
[Non-Patent Literature 2]
　3GPP TS38.214 V16.2.0

SUMMARY OF INVENTION

However, since the above-described repetition Type A is a repetition type that applies PUSCH repetition transmission using consecutive slots, it is not possible to apply PUSCH repetition transmission when a TDD pattern is "DDDSU" or the like. "D" means a slot used only for a downlink symbol (hereinafter, D slot), "U" means a slot used only for an uplink symbol (hereinafter, U slot), and "S" means a slot used for downlink and uplink symbols (hereinafter, S slot).

Since the above-described repetition Type B is a repetition type in which a symbol to which a downlink is assigned is treated as an invalid symbol, applying PUSCH repetition transmission using nonconsecutive slots is itself possible. However, the number of transmission occasions for PUSCH repetition transmission is incremented also in a D slot and an S slot, and thus a signal using a PUSCH cannot be transmitted in D slots and the number of symbols that can be used to transmit a signal using a PUSCH is small in S slots. In addition, since a guard symbol is not treated as an invalid symbol, the specifications for repetition Type B is also basically designed for consecutive slots.

After diligent studies, the inventors have discovered the possibility of improving PUSCH channel quality, based on the finding that PUSCH repetition transmission using non-consecutive slots is not appropriately anticipated in the above-described techniques.

Therefore, the following disclosure has been made in view of such circumstances, and an object of the disclosure is to provide a terminal capable of improving channel quality.

The present disclosure is a terminal including a transmission unit that performs repetition transmission of an uplink signal using an uplink channel, wherein the transmission unit performs the repetition transmission using specific slots that are nonconsecutive and allocated as transmission occasions for the repetition transmission.

BRIEF DESCRIPTION OF DRAWINGS

FIG. 4 is a functional block configuration diagram of a UE 200.

FIG. 5 is a diagram for illustrating repetition transmission.

FIG. 6 is a diagram for illustrating repetition transmission.

FIG. 9 illustrates an example of a PUSCH-Config information element (ASN-1 format).

FIG. 13 is a diagram illustrating an example of the PUSCH-Config information element (ASN-1 format).

MODES FOR CARRYING OUT THE INVENTION

Figure 1:
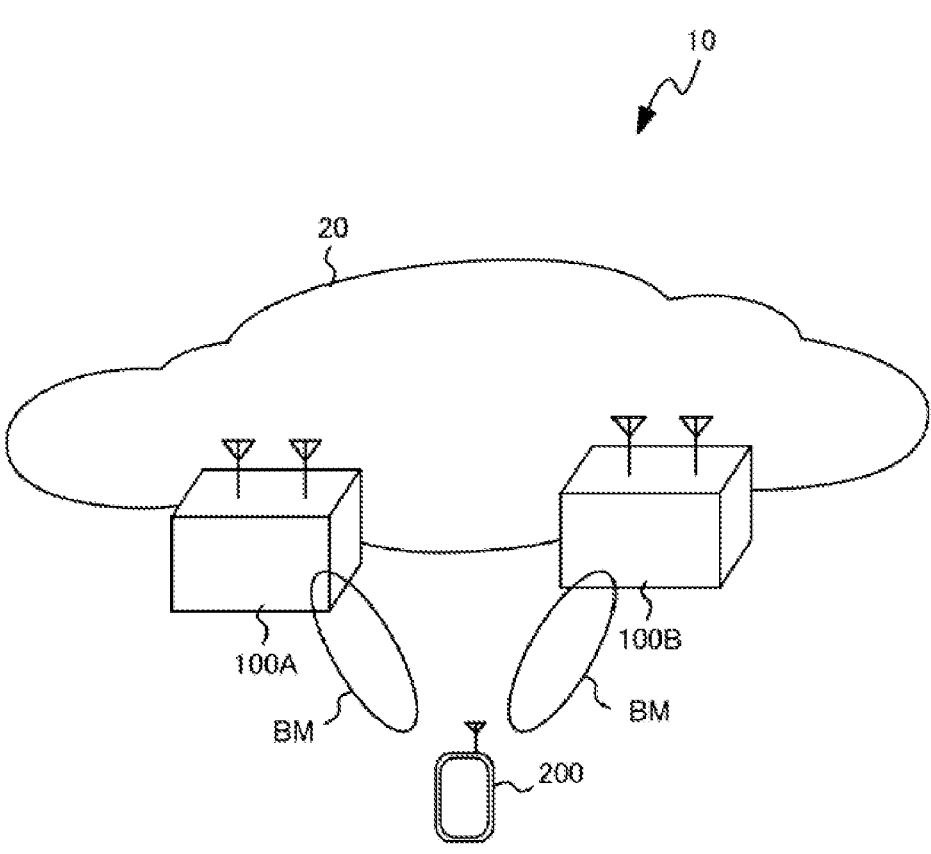
FIG. 1 is an overall schematic diagram of a radio communication system 10.

Exemplary embodiments of the present invention are described below with reference to the accompanying drawings. Note that the same or similar reference numerals have been attached to the same functions and configurations, and the description thereof is omitted as appropriate.

EMBODIMENTS (1) Overall Schematic Configuration of the Radio Communication System FIG. 1 is an overall schematic configuration diagram of a radio communication system 10 according to an embodiment. The radio communication system 10 is a 5G New Radio (NR) compliant radio communication system and includes a Next Generation-Radio Access Network 20 (hereinafter, NG-RAN 20) and a terminal 200 (hereinafter, UE 200).

The radio communication system 10 may be compliant with a system called Beyond 5G, 5G Evolution, or 6G.

The NG-RAN 20 includes a radio base station 100A (hereinafter, gNB 100A) and a radio base station 100B (hereinafter, gNB 100B). The specific configuration of the radio communication system 10 including the number of gNBs and UEs is not limited to the example in FIG. 1.

The NG-RAN 20 actually includes a plurality of NG-RAN Nodes, specifically gNBs (or ng-eNBs), and is connected to a core network (5GC, not illustrated) in accordance with 5G. The NG-RAN 20 and 5GC may be expressed simply as a "network".

The gNB 100A and gNB 100B are radio base stations in accordance with 5G and execute radio communication according to the UE 200 and 5G. The gNB 100A, gNB 100B, and UE 200 can support Massive MIMO (Multiple-Input Multiple-Output) for generating a beam BM having higher directivity by controlling radio signals transmitted from a plurality of antenna elements, Carrier Aggregation (CA) for bundling a plurality of Component Carriers (CCs), and Dual Connectivity (DC) for performing simultaneous communication with two or more transport blocks between the UE and each of the two NG-RAN Nodes.

Figure 2:
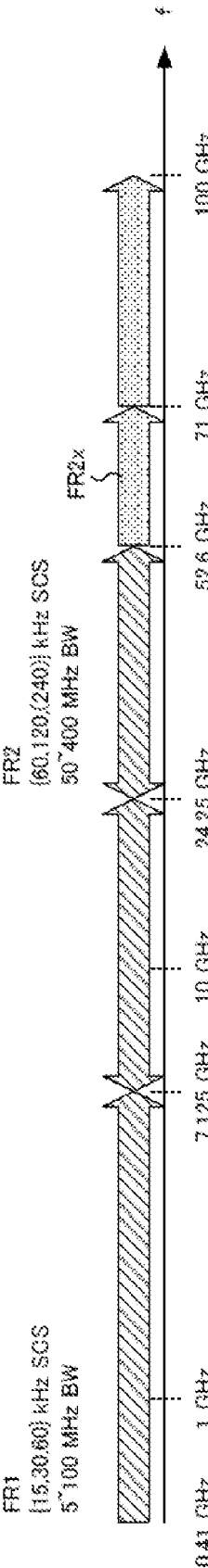
FIG. 2 is a diagram illustrating frequency ranges used in the radio communication system 10.

The radio communication system 10 corresponds to a plurality of frequency ranges (FRs). FIG. 2 illustrates frequency ranges used in the radio communication system 10.

As illustrated in FIG. 2, the radio communication system 10 corresponds to FR1 and FR2. The frequency bands of each FR are as follows.

FR1: 410 MHz to 7.125 GHZ

FR2: 24.25 GHz to 52.6 GHz

FR1 may use a SubCarrier Spacing (SCS) of 15, 30, or 60 kHz and a bandwidth (BW) of 5 to 100 MHz. FR2 has a higher frequency than FR1 and may use an SCS of 60 or 120 kHz (240 kHz may be included) and a bandwidth (BW) of 50 to 400 MHZ.

The SCS may be interpreted as numerology. Numerology is defined in 3GPP TS38.300 and corresponds to one Sub-Carrier Spacing in the frequency domain.

The radio communication system 10 supports a frequency band higher than that of FR 2. Specifically, the radio communication system 10 supports a frequency band above 52.6 GHz and up to 114.25 GHz. Such a high frequency band may be called "FR2x" for convenience.

When a band above 52.6 GHz is used in response to the above issue, Cyclic Prefix-Orthologous Frequency Division Multiplexing (CP-OFDM) or Discrete Fourier Transform-Spread (DFT-S-OFDM) having a larger SubCarrier Spacing (SCS) may be applied.

Figure 3:
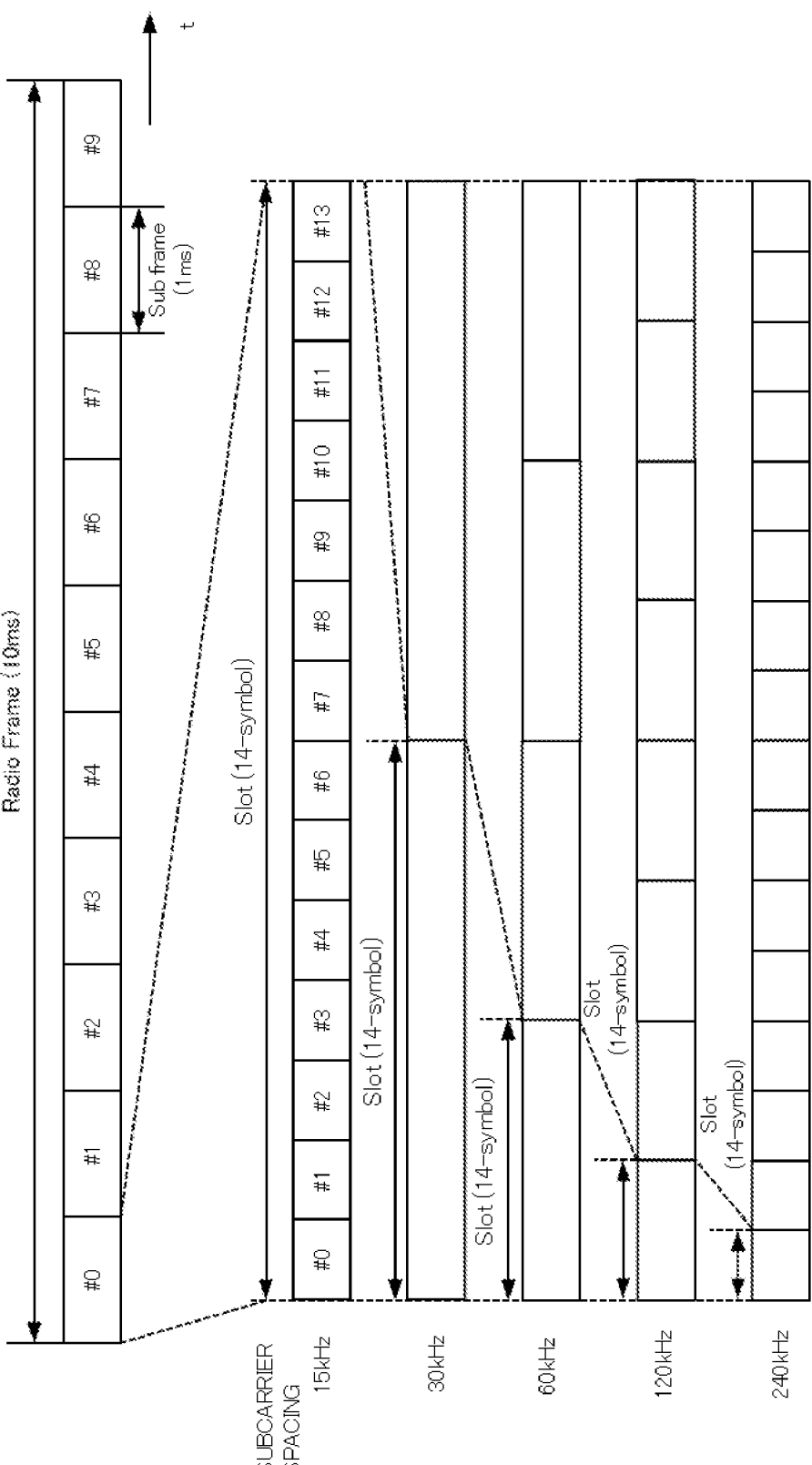
FIG. 3 is a diagram illustrating a configuration example of a radio frame, subframes, and slots used in the radio communication system 10.

FIG. 3 illustrates a configuration example of a radio frame, subframes, and slots used in the radio communication system 10.

As illustrated in FIG. 3, one slot consists of 14 symbols, and the SCS gets larger (wider) as the symbol length (and the slot length) gets shorter. The SCS is not limited to the spacing (frequencies) in FIG. 3. For example, 480 kHz, 960 kHz, and the like may be used.

The number of symbols constituting one slot does not necessarily have to be 14 and may be 28 or 56 symbols, for example. The number of slots per subframe may differ depending on the SCS.

A time direction (t) in FIG. 3 may be referred to as a time domain, a symbol length, or a symbol time. A frequency direction may be referred to as a frequency domain, a resource block, a subcarrier, or a Bandwidth Part (BWP).

A DMRS is a type of reference signal and is prepared for various channels. Here, unless otherwise noted, a DMRS may refer to one for a downlink data channel, specifically, one for a PDSCH (Physical Downlink Shared Channel). However, a DMRS for an upstream data channel, specifically for a PUSCH (Physical Uplink Shared Channel), may be interpreted in the same manner as a DMRS for a PDSCH.

The DMRS can be used for channel estimation in a device, for example, in the UE 200 as part of coherent demodulation. The DMRS may exist only in a Resource Block (RB) used for a PDSCH transmission.

The DMRS may have multiple mapping types. Specifically, the DMRS has mapping type A and mapping type B. In mapping type A, the first DMRS is arranged on the second or third symbol of a slot. In mapping type A, the DMRS may be mapped relative to slot boundaries regardless of where in the slot the actual data transmission begins. The reason why the first DMRS is arranged on the second or third symbol of the slot may be interpreted as to arrange the first DMRS after control resource sets (CORESET).

In mapping type B, the first DMRS may be arranged on the first symbol in data allocation. That is, the position of the DMRS may be assigned relative to where data is allocated, not relative to slot boundaries.

The DMRS may have multiple types. Specifically, the DMRS has Type 1 and Type 2. Type 1 and Type 2 differ in mapping in the frequency domain and the maximum number of orthogonal reference signals. Type 1 can output up to four orthogonal signals with a single-symbol DMRS, while Type 2 can output up to eight orthogonal signals with a double-symbol DMRS.

(2) Functional Block Configuration of the Radio Communication System

Next, a functional block configuration of the radio communication system 10 will be described. Specifically, a functional block configuration of the UE 200 will be described.

FIG. 4 is a functional block configuration diagram of the UE 200. As illustrated in FIG. 4, the UE 200 includes a radio signal transmission and reception unit 210, an amplifier unit 220, a modulation and demodulation unit 230, a control signal and reference signal processing unit 240, an encoding/decoding unit 250, a data transmission and reception unit 260, and a control unit 270.

The radio signal transmission and reception unit 210 transmits and receives radio signals in accordance with NR. The radio signal transmission and reception unit 210 supports Massive MIMO, CA for bundling multiple CCs together, and DC for performing simultaneous communication between the UE and each of the two NG-RAN Nodes.

In the embodiment, the radio signal transmission and reception unit 210 constitutes a transmission unit that performs repetition transmission of an uplink signal using an uplink channel. The radio signal transmission and reception unit 210 executes repetition transmission using nonconsecutive specific slots allocated as transmission occasions for repetition transmission. The following describes a case where the uplink channel is a PUSCH. The details of the repetition transmission will be described below (see FIGS. 5 and 6).

The amplifier unit 220 is configured by a PA (Power Amplifier), an LNA (Low Noise Amplifier), or the like. The amplifier unit 220 amplifies the signal output from the modulation and demodulation unit 230 to a predetermined power level. The amplifier unit 220 also amplifies the RF signal output from the radio signal transmission and reception unit 210.

The modulation and demodulation unit 230 performs data modulation/demodulation, transmission power setting, resource block allocation, and the like for each predetermined communication destination (gNB 100 or other gNB). In the modulation and demodulation unit 230, Cyclic Prefix-Orthogonal Frequency Division Multiplexing (CP-OFDM) or Discrete Fourier Transform-Spread (DFT-S-OFDM) may be applied. DFT-S-OFDM may also be used for a downlink (DL) as well as an uplink (UL).

The control signal and reference signal processing unit 240 executes processing relating to various control signals transmitted and received by the UE 200 and processing relating to various reference signals transmitted and received by the UE 200.

Specifically, the control signal and reference signal processing unit 240 receives various control signals transmitted from the gNB 100 via a predetermined control channel, for example, a control signal of a Radio Resource Control (RRC) layer. The control signal and reference signal processing unit 240 transmits various control signals to the gNB 100 through a predetermined control channel.

The control signal and reference signal processing unit 240 executes processing using a Reference Signal (RS) such as a Demodulation Reference Signal (DMRS) and a Phase Tracking Reference Signal (PTRS).

A DMRS is a known reference signal (pilot signal), between a base station and a terminal, of each terminal for estimating a fading channel used for data demodulation. A PTRS is a reference signal for each terminal for the purpose of estimating phase noise, which becomes an issue in a high frequency band.

The reference signal includes a Channel State Information-Reference Signal (CSI-RS), a Sounding Reference Signal (SRS), and a Positioning Reference Signal (PRS) for location information, in addition to the DMRS and PTRS.

The channel includes a control channel and a data channel. The control channel includes a PDCCH (Physical Downlink Control Channel), a PUCCH (Physical Uplink Control Channel), an RACH (Random Access Channel), Downlink Control Information (DCI) including a Random Access Radio Network Temporary Identifier (RA-RNTI), and a Physical Broadcast Channel (PBCH).

The data channel includes a PDSCH (Physical Downlink Shared Channel) and a PUSCH (Physical Uplink Shared Channel). Data here means data that is transmitted over a data channel. "Data channel" may be substituted with "shared channel".

Here, the control signal and reference signal processing unit 240 receives Downlink Control Information (DCI). The DCI includes existing fields to store DCI Formats, a Carrier Indicator (CI), a BWP indicator, an FDRA (Frequency Domain Resource Allocation), a TDRA (Time Domain Resource Allocation), an MCS (Modulation and Coding Scheme), an HPN (HARQ Process Number), an NDI (New Data Indicator), an RV (Redundancy Version), and the like.

A value stored in a DCI Format field is an information element that specifies a format of the DCI. A value stored in a CI field is an information element that specifies a CC to which the DCI is applied. A value stored in a BWP indicator field is an information element that specifies a BWP to which the DCI is applied. The BWP that can be specified by the BWP indicator is set based on an information element (BandwidthPart-Config) included in an RRC message. A value stored in an FDRA field is an information element that specifies a frequency domain resource to which the DCI is applied. The frequency domain resource is identified based on a value stored in the FDRA field and an information element (RA Type) included in the RRC message. A value stored in a TDRA field is an information element that specifies a time domain resource to which the DCI is applied. The time domain resource is identified based on a value stored in the TDRA field and an information element (pdsch-TimeDomainAllocationList, pusch-TimeDomainAllocationList) included in the RRC message. The time domain resource may be identified based on a value stored in the TDRA field and a default table. A value stored in an MCS field is an information element that specifies an MCS to which the DCI is applied. The MCS is identified based on a value stored in the MCS and an MCS table. The MCS table may be specified based on the RRC message or identified based on RNTI scrambling. A value stored in an HPN field is an information element that specifies an HARQ Process to which the DCI is applied. A value stored in the NDI is an information element that identifies whether data to which the DCI is applied is new transmission data. A value stored in an RV field is an information element that specifies the redundancy of data to which the DCI is applied.

The encoding/decoding unit 250 executes data division/connection, channel coding/decoding, and the like for each predetermined communication destination (gNB 100 or other gNB).

Specifically, the encoding/decoding unit 250 divides the data output from the data transmission and reception unit 260 into predetermined sizes and executes channel coding on the divided data. The encoding/decoding unit 250 decodes the data output from the modulation and demodulation unit 230 and connects the decoded data.

The data transmission and reception unit 260 performs sending and receiving in Protocol Data Units (PDU) and Service Data Units (SDU). Specifically, the data transmission and reception unit 260 performs assembly, disassembly, and the like of PDUs/SDUs in a plurality of layers (Media Access Control (MAC) layer, Radio Link Control (RLC) layer, Packet Data Convergence Protocol (PDCP) layer, and the like). The data transmission and reception unit 260 executes error correction and retransmission control of data based on a hybrid automatic repeat request (ARQ).

The control unit 270 controls each of the functional blocks constituting the UE 200. In particular, in the embodiment, the control unit 270 controls the above-described PUSCH repetition transmission. The details of the repetition transmission will be described below (see FIGS. 5 and 6).

(3) Repetition Transmission

PUSCH repetition transmission will be described below. Here, a case where the TDD pattern is "DDDSU" will be mainly described. "D" means a slot used only for a downlink symbol (hereinafter, D slot), "U" means a slot used only for an uplink symbol (hereinafter, U slot), and "S" means a slot used for downlink and uplink symbols (hereinafter, S slot). "K" means a slot number assigned as a PUSCH transmission occasion for repetition transmission.

(3.1) Existing Repetition Transmission

The following describes repetition types relating to existing repetition transmission. As illustrated in FIG. 5, repetition Type A and repetition Type B are present as the existing repetition types.

As illustrated in the upper part of FIG. 5, repetition Type A is a repetition type that applies a PUSCH repetition using consecutive slots. Thus, repetition Type A is applied to a case where the TDD pattern includes consecutive U slots. In repetition Type A, symbols at the same position in slots may be used for the repetition transmission.

As illustrated in the lower part of FIG. 5, repetition Type B is a repetition type in which a symbol to which an uplink is assigned is treated as valid, and a symbol to which a downlink is assigned is treated as invalid. That is, repetition Type B is applicable to a case where the TDD pattern includes nonconsecutive U slots. In repetition Type B, symbols at different positions in slots may be used for the repetition transmission.

However, in repetition Type B, only a symbol to which a downlink is assigned is treated as invalid, and D and S slots are also counted as slots to be allocated as PUSCH transmission occasions. In other words, D and S slots are treated as slots allocated as PUSCH transmission occasions, while symbols treated as invalid are merely not used to transmit an uplink signal using a PUSCH.

As described above, the existing repetition types assume that consecutive slots are allocated as PUSCH transmission occasions.

(3.2) Repetition Transmission According to an Embodiment

Repetition transmission according to an embodiment will be described below. As illustrated in FIG. 6, in repetition transmission according to the embodiment, nonconsecutive specific slots are allocated as PUSCH transmission occasions. For example, U slots are allocated as specific slots, and D and S slots are not allocated as specific slots. S slots may be allocated as specific slots. That is, slots other than the specific slots are not counted as slots allocated as a PUSCH transmission occasion. A specific slot spacing in a TDD pattern may be referred to as a pusch-SlotAllocation.

That is, in the embodiment, it is possible to appropriately perform PUSCH repetition transmission by introducing a new concept of "nonconsecutive specific slots" allocated as PUSCH transmission occasions. It is thus possible to realize PUSCH coverage enhancement.

Here, the repetition type of the repetition transmission in FIG. 6 can be considered as follows.

First, the repetition type of the repetition transmission in FIG. 6 may be considered as an extension of repetition Type A in FIG. 5. In such a case, nonconsecutive specific slots may be treated as pseudo-consecutive slots. In a similar manner, the repetition type of the repetition transmission in FIG. 6 may be considered as an extension of repetition Type B in FIG. 5. In such a case, nonconsecutive specific slots may be treated as pseudo-consecutive slots. The repetition type of the repetition transmission in FIG. 6 may be considered as an extension of repetition Type A and repetition Type B in FIG. 5.

Second, the repetition type of the repetition transmission in FIG. 6 may be considered as a new repetition type (for example, repetition Type C) that is different from repetition Type A and repetition Type B in FIG. 5.

(4) Operation Example

An operation example according to the embodiment will be described below.

Figure 7:
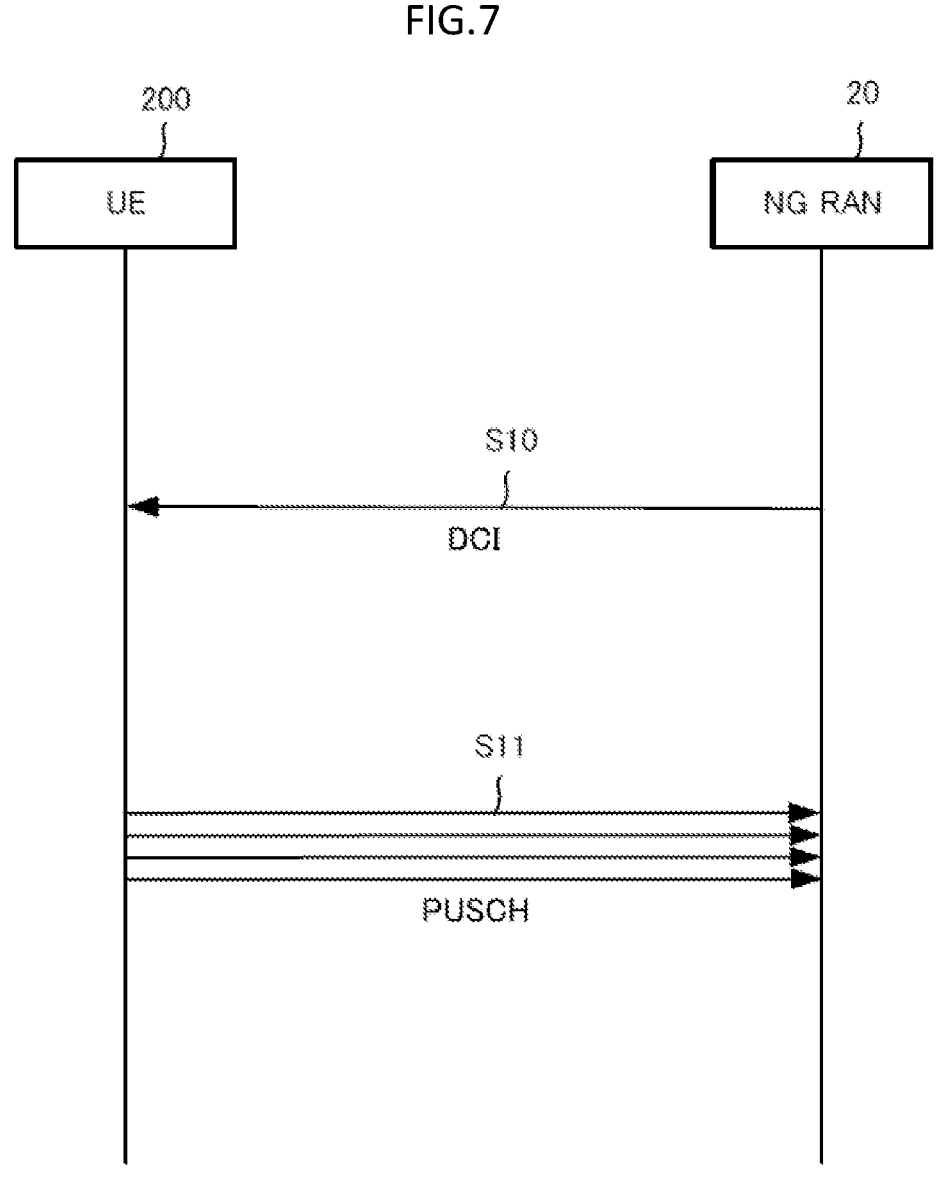
FIG. 7 is a diagram illustrating an operation example.

As illustrated in FIG. 7, in step S10, the UE 200 receives a DCI from the NG-RAN 20. The DCI includes a TDRA and the like.

In step S11, the UE 200 performs repetition transmission of an uplink signal using a PUSCH by applying nonconsecutive specific slots allocated as PUSCH transmission occasions.

(5) Action and Effect

In the embodiment, it is possible to appropriately perform PUSCH repetition transmission by introducing a new concept of "nonconsecutive specific slots" allocated as PUSCH transmission occasions. It is thus possible to realize PUSCH coverage enhancement.

Modified Example 1

Modified example 1 of the embodiment will be described below. Differences from the embodiment will be mainly described below.

Modified example 1 describes a case where allocation of specific slots is explicitly notified from the NG-RAN 20. For example, the UE 200 receives from the NG-RAN 20 an information element indicating the above-described pusch-SlotAllocation.

As described above, the pusch-SlotAllocation is a specific slot spacing in a TDD pattern. The specific slot spacing may be represented with the number of slots ("4" in FIG. 6) that exist between specific slots. The specific slot spacing may be represented by a next specific slot position ("5" in FIG. 6). The pusch-SlotAllocation may be represented with predetermined values (for example, ENUMERATED(n1, n2, n3, n4)) or with arbitrary values (for example, INTEGER(0 . . . 20)).

(1) Operation Example

An example operation of modified example 1 will be described below.

Figure 8:
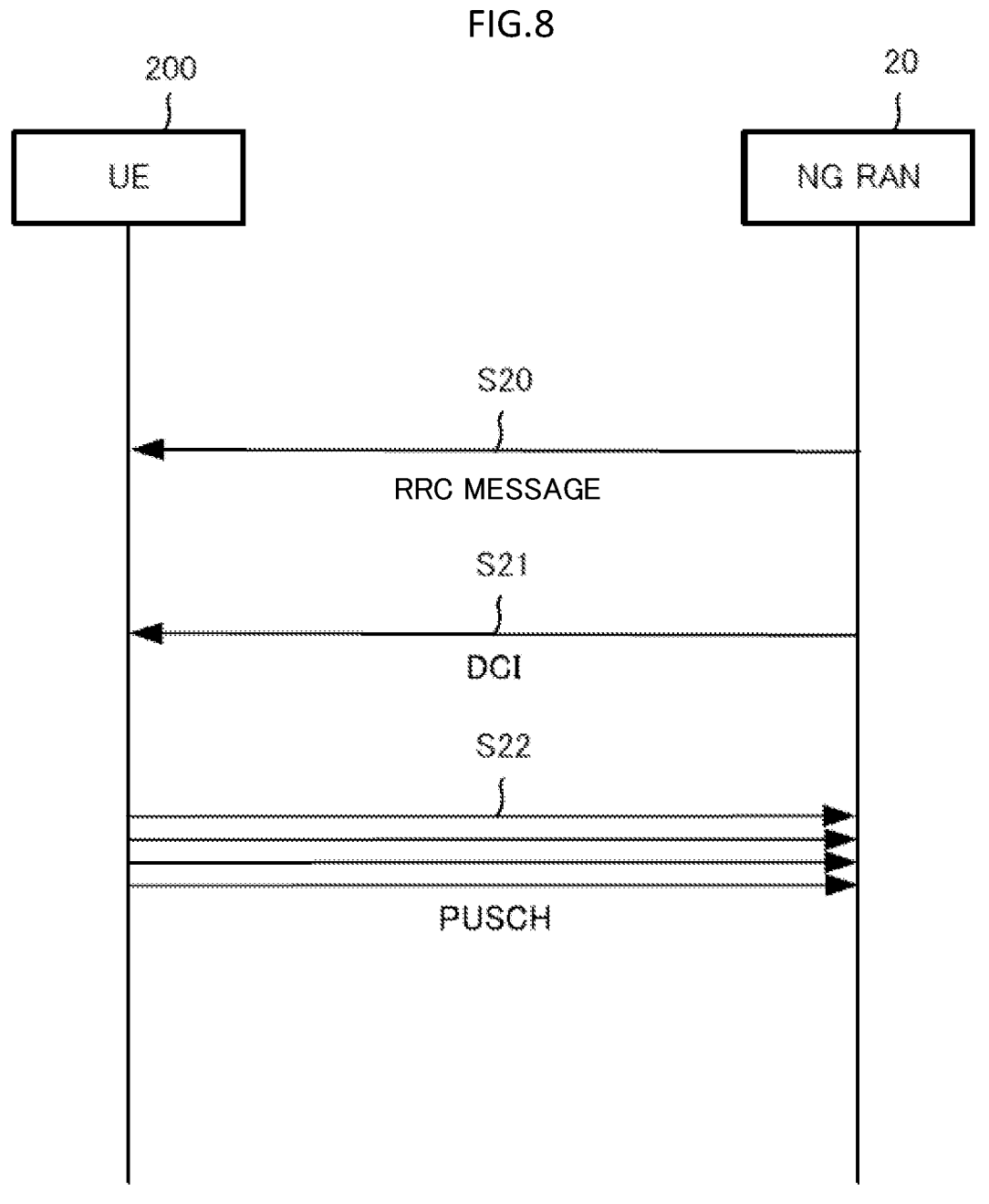
FIG. 8 is a diagram illustrating an operation example according to modified example 1.

As illustrated in FIG. 8, in step S20, the UE 200 receives an RRC message. The RRC message includes an information element indicating the pusch-SlotAllocation. As illustrated in FIG. 9, the pusch-SlotAllocation may be an extension IE of PUSCH-Config information.

In step S21, the UE 200 receives a DCI from the NG-RAN 20. The DCI includes a TDRA and the like.

In step S22, the UE 200 identifies specific slots based on the pusch-SlotAllocation. The UE 200 performs repetition transmission of an uplink signal using a PUSCH by applying nonconsecutive specific slots allocated as PUSCH transmission occasions.

Modified Example 2

Modified example 2 of the embodiment will be described below. Differences from the embodiment will be mainly described below.

The embodiment describes the case where the TDD pattern is "DDDSU". In contrast, modified example 2 describes a case where the TDD pattern is "DDDSUU". That is, modified example 2 describes a case where the TDD pattern includes consecutive U slots.

Figure 10:
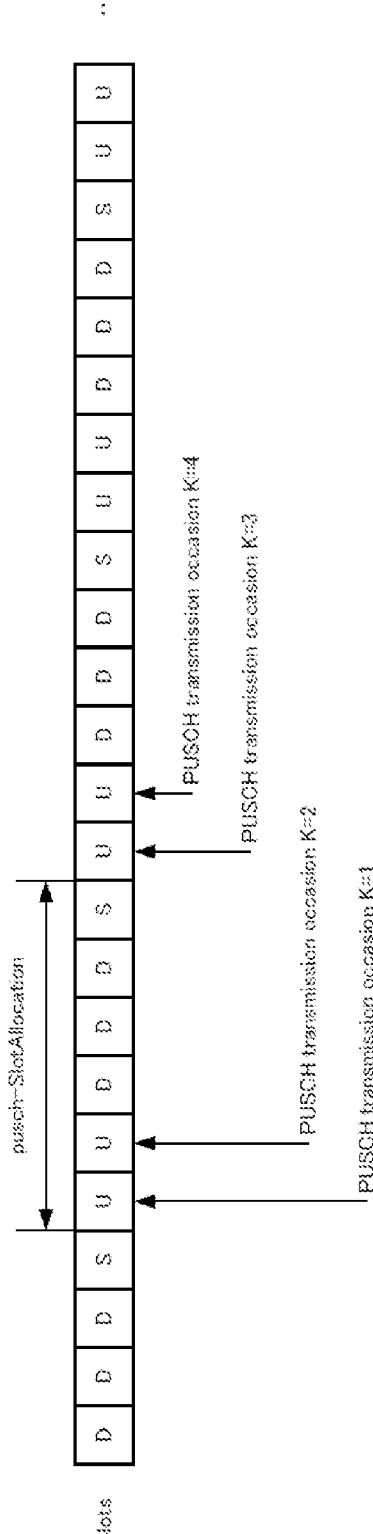
FIG. 10 is a diagram for illustrating repetition transmission according to modified example 2.
Figure 11:
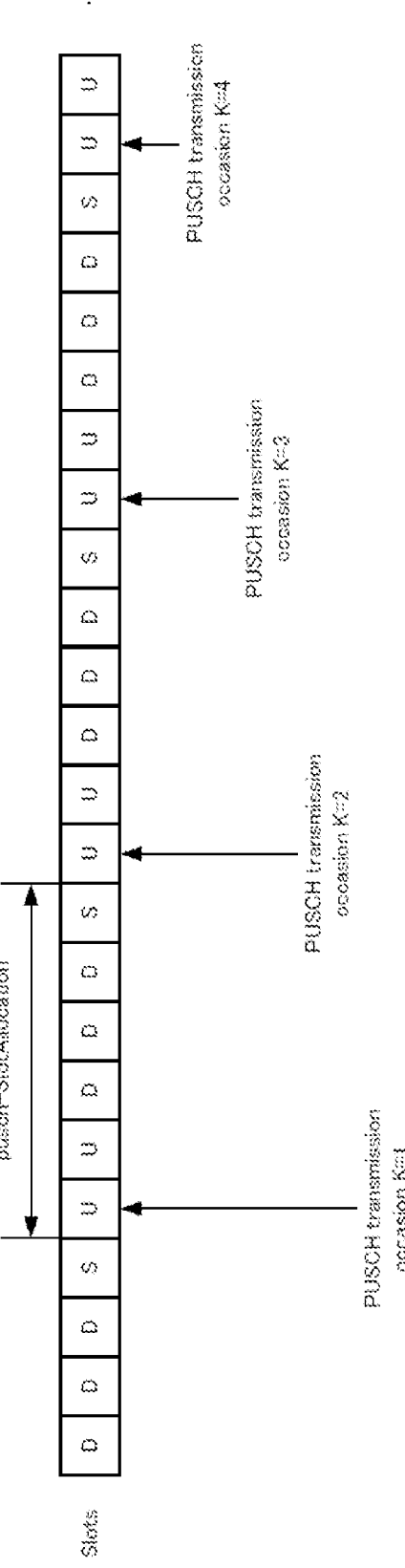
FIG. 11 is a diagram for illustrating repetition transmission according to modified example 2.

First, all the U slots included in the TDD pattern may be allocated as specific slots as illustrated in FIG. 10. Second, one of the U slots included in the TDD pattern may be allocated as a specific slot as illustrated in FIG. 11.

In these cases, the pusch-SlotAllocation may be defined as a spacing between specific slots (U slots) whose positions are identical in the TDD pattern. For example, the specific slot spacing may be represented with the number of slots ("5" in FIGS. 10 and 11) that exist between specific slots. The specific slot spacing may be represented with the next specific slot position ("6" in FIGS. 10 and 11).

In FIG. 10, specific slots are consecutive in the TDD pattern, but it should be noted that, as a whole, nonconsecutive specific slots are allocated as PUSCH transmission occasions.

Modified Example 3

Modified example 3 of the embodiment will be described below. Differences from modified example 2 will be mainly described below.

Modified example 3 describes a case where allocation of specific slots is explicitly notified from the NG-RAN 20. For example, the UE 200 receives from the NG-RAN 20 an information element indicating the number of consecutive specific slots in a TDD pattern (for example, pusch-Duration). In the case in FIG. 10, the pusch-Duration may be "2", and in the case in FIG. 11, the pusch-Duration may be "1". The pusch-SlotAllocation may be represented with predetermined values (for example, ENUMERATED (n1, n2)). When the pusch-Duration is not set, a default value may be used. The default value may be "1 (slot)".

In addition to the information element indicating the pusch-Duration, the UE 200 may receive an information element indicating the pusch-Slot Allocation described above. That is, the UE 200 may specify specific slots based on the pusch-Slot Allocation and the pusch-Duration.

(1) Operation Example

An operation example of modified example 3 will be described below.

Figure 12:
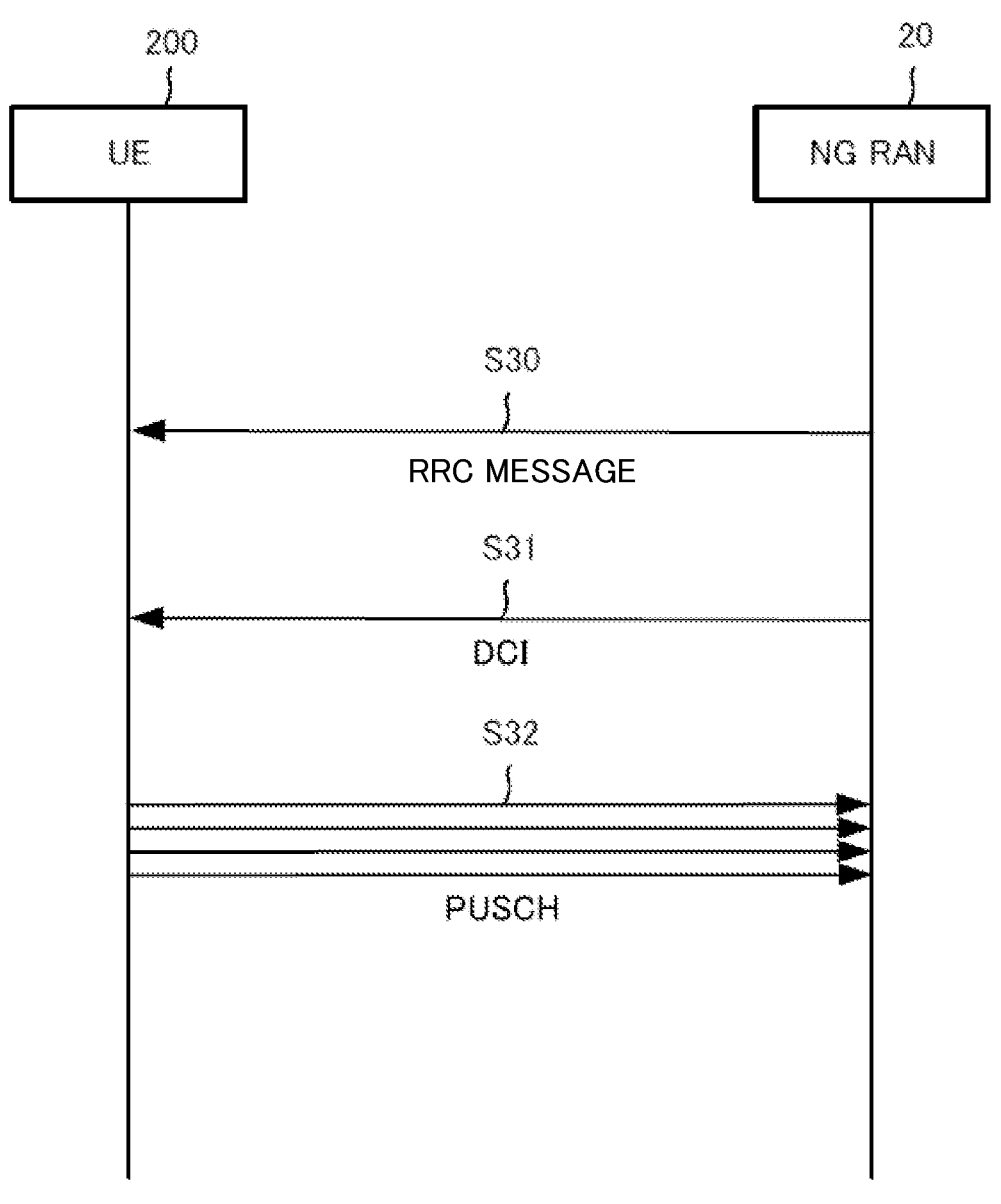
FIG. 12 is a diagram illustrating an operation example according to modified example 3.

As illustrated in FIG. 12, in step S30, the UE 200 receives an RRC message. The RRC message includes an information element indicating the pusch-Duration. As illustrated in FIG. 13, the pusch-SlotAllocation may be an extension IE of PUSCH-Config information. The RRC message may include an information element indicating the pusch-SlotAllocation.

In step S31, the UE 200 receives a DCI from the NG-RAN 20. The DCI includes a TDRA and the like.

In step S32, the UE 200 identifies specific slots based on the pusch-Duration. The UE 200 may identify specific slots based on the pusch-SlotAllocation. The UE 200 performs repetition transmission of an uplink signal using a PUSCH, by applying nonconsecutive specific slots allocated as PUSCH transmission occasions.

Modified Example 4

Modified example 4 of the embodiment will be described below. Differences from modified examples 1 and 3 will be mainly described below.

Modified examples 1 and 3 describe the case where allocation of specific slots (spacing or number of consecutive slots) is explicitly notified from the NG-RAN 20. In contrast, in modified example 4, the UE 200 may implicitly specify specific slots.

Specifically, the UE 200 identifies specific slots based on a time-division multiplexing pattern (hereinafter, TDD pattern) assigned to the UE 200. For example, the UE 200 may identify a U slot based on the TDD pattern and may identify the identified U slot as a specific slot. In other words, the UE 200 does not identify at least a D slot included in the TDD pattern as a specific slot. The UE 200 may specify an S slot included in the TDD pattern as a specific slot and may not specify an S-slot included in the TDD pattern as a specific slot.

The UE 200 may identify a TDD pattern based on tdd-UL-DL-Configuration Common or tdd-UL-DL-Configuration Dedicated. The tdd-UL-DL-Configuration Common may be an information element included in a broadcast message (SIB: System Information Block) received from the NG-RAN 20. The tdd-UL-DL-ConfigurationDedicated may be an information element included in an RRC message. The UE 200 may identify a TDD pattern based on slotFormat-Combination included in a DCI.

Modified Example 5

Modified example 5 of the embodiment will be described below. Differences from modified examples 1 and 3 will be mainly described below.

Modified examples 1 and 3 describe the case where allocation of specific slots (spacing or number of consecutive slots) is explicitly notified from the NG-RAN 20. In contrast, in modified example 5, specific slots may be predetermined in accordance with the TDD pattern.

Specifically, when the TDD pattern is "DDDSU" in FIG. 6, a specific slot spacing may be predetermined. When the TDD pattern is "DDDSUU" in FIG. 9 (or FIG. 10), a specific slot spacing and the number of consecutive specific slots may be predetermined.

Modified Example 6

Modified example 6 of the embodiment will be described below. Differences from the embodiment will be mainly described below.

Figure 14:
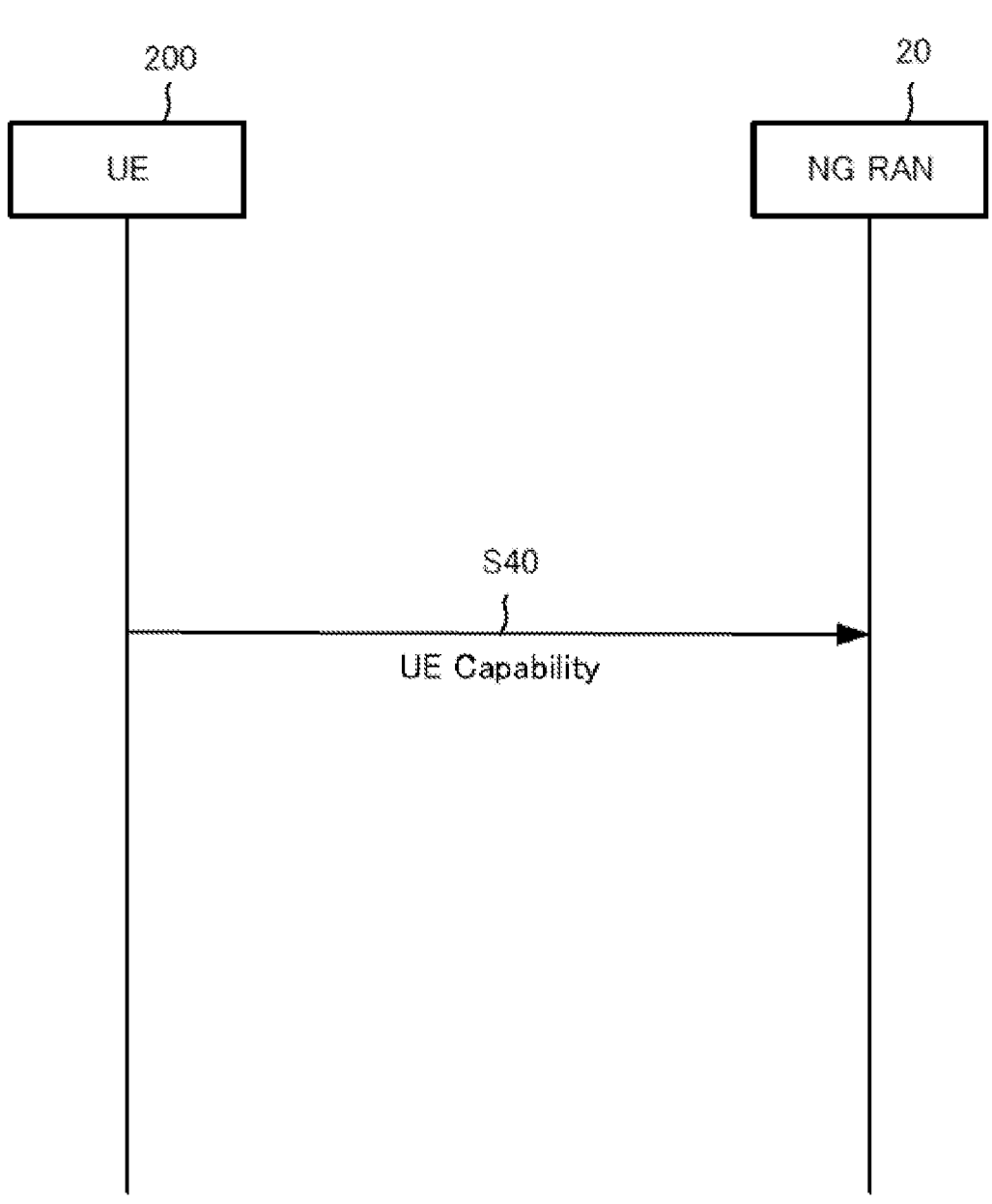
FIG. 14 is a diagram illustrating an operation example according to modified example 6.

In modified example 6, the UE 200 transmits a message including an information element (hereinafter, UE capability) relating to a capability of repetition transmission using specific slots (step S40 in FIG. 14). The UE capability may include the following information elements.

For example, the UE capability may include an information element that indicates availability of support for repetition transmission using nonconsecutive specific slots by means of the above-described extension of repetition Type A. The UE capability may include an information element that indicates availability of support for repetition transmission using nonconsecutive specific slots by means of the above-described extension of repetition Type B. The UE capability may include an information element that indicates availability of support for repetition transmission using nonconsecutive specific slots by means of the extension of repetition Type A and repetition Type B. The UE capability may include an information element that indicates availability of support for a newly introduced repetition type (for example, the above-described repetition Type C). Hereinafter, these information elements will be referred to as information elements indicating availability of support.

For example, the UE capability may include an information element that represents the availability of support for each frequency. Such an information element may include an information element specifying all frequencies, may include an information element indicating an individual frequency, or may include an information element indicating a frequency range (for example, FR1, FR2, and the like). The information element specifying all frequencies can represent the availability of support as the UE 200.

For example, the UE capability may include an information element that represents capability of support for each duplex system. Such an information element may include an information element specifying all of the duplex systems or may include an information element indicating an individual duplex system (TDD, FDD, and the like). The information element specifying all the duplex systems can represent the availability of support as the UE 200.

Other Embodiments

Although the contents of the present invention have been described in accordance with the embodiment, it is obvious to those skilled in the art that the present invention is not limited to the descriptions and that various modifications and improvements thereof are possible.

Although not specifically mentioned in the embodiment, in the above-described repetition Type B, when repetition transmission using nonconsecutive specific slots is set, an extension may be implemented to change the handling of invalid symbols from "drop" to "shift". "Drop" means that an invalid symbol is counted as a PUSCH transmission occasion, and "shift" means that an invalid symbol is counted as a PUSCH transmission occasion. In such a case, S slots having a mixture of invalid and valid symbols may be counted as PUSCH transmission occasions.

In the embodiment, a PUSCH is exemplified as a channel to which repetition transmission using nonconsecutive specific slots is applied. However, the embodiment is not limited to this. The embodiment can be applied as an extension of repetition transmission to a channel defined to perform repetition transmission using consecutive slots. For example, a channel to which the repetition transmission using nonconsecutive specific slots is applied may be a PUCCH.

Although not specifically mentioned in the embodiment, the UE 200 may receive a message including an information element that indicates whether or not to set up repetition transmission using nonconsecutive specific slots. Such a message may be an RRC message.

The block diagram (FIG. 4) used in the description of the above-described embodiment shows blocks in units of functions. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting (sending), outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting may be called a transmitting unit or a transmitter. For any of the above, as described above, the realization method is not limited to any one method.

Figure 15:
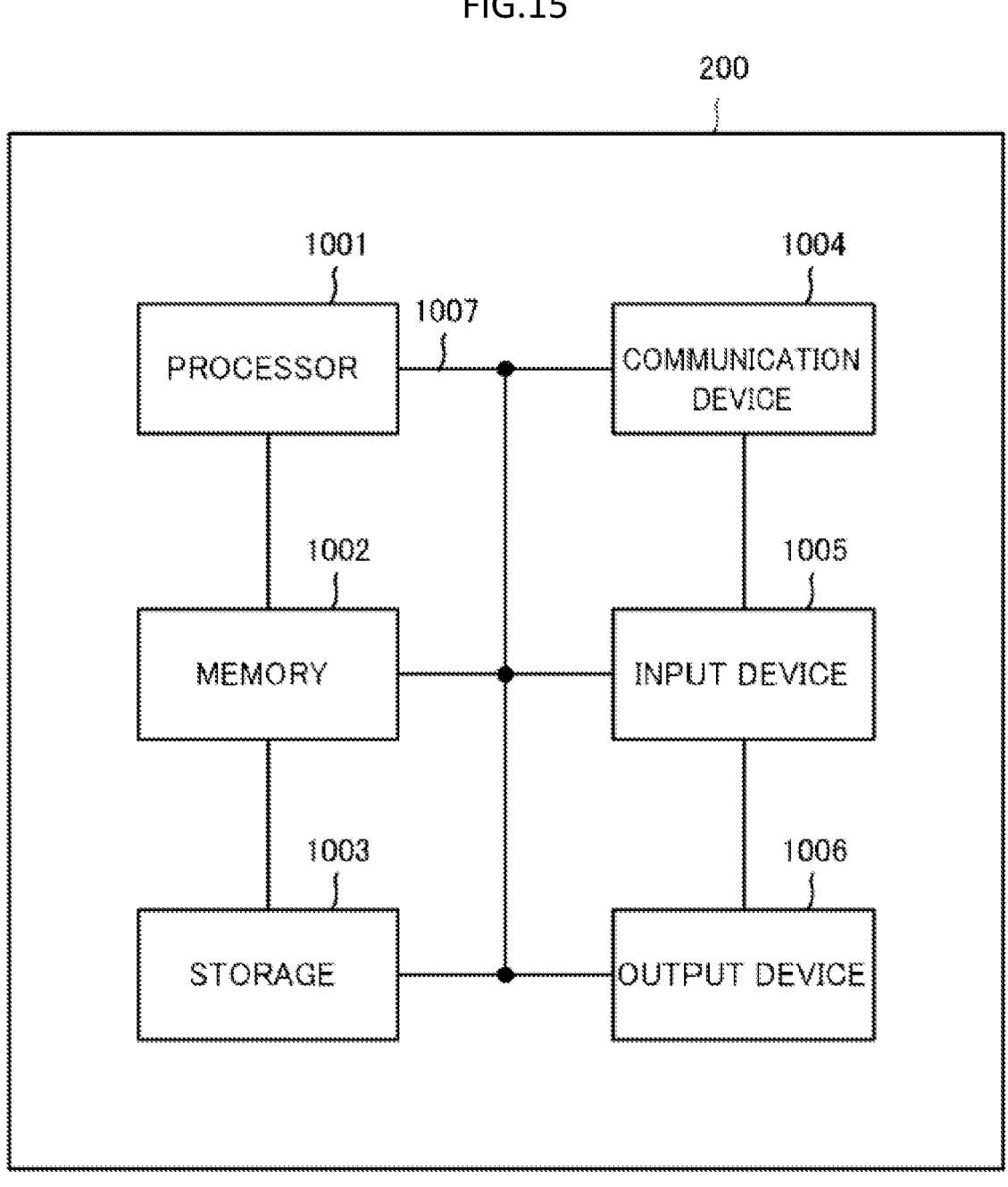
FIG. 15 is a diagram illustrating an example of a hardware configuration of the UE 200.

Further, the UE 200 (the device) described above may function as a computer that performs processing of the radio communication method of the present disclosure. FIG. 15 is a diagram illustrating an example of a hardware configuration of the device. As illustrated in FIG. 15, the device may be configured as a computer device including a processor 1001, a memory 1002, a storage 1003, a communication device 1004, an input device 1005, an output device 1006, a bus 1007, and the like.

In the following description, the term "device" can be substituted with "circuit", "device", "unit", or the like. A hardware configuration of the device may include one or plurality of the devices in the figure or may not include some of the devices.

Each of the functional blocks (see FIG. 4) of the device is implemented by means of any hardware element of the computer device or a combination of the hardware elements.

Each of the functions of the device is realized by reading predetermined software (programs) onto hardware such as the processor 1001 and the memory 1002 so that the processor 1001 performs arithmetic operations to control communication by the communication device 1004 and to control at least one of reading and writing of data in the memory 1002 and the storage 1003.

The processor 1001 operates, for example, an operating system to control the entire computer. The processor 1001 may comprise a Central Processing Unit (CPU) including interfaces to peripheral devices, controllers, arithmetic units, registers, and the like.

Moreover, the processor 1001 reads a computer program (program code), a software module, data, and the like from the storage 1003 and/or the communication device 1004 into the memory 1002 and executes various processes according to them. As the computer program, a computer program that is capable of executing on the computer at least part of the operation described in the above embodiment is used. Various processes described above can be executed by one processor 1001 or can be executed simultaneously or sequentially by two or more processors 1001. The processor 1001 can be implemented by using one or more chips. The computer program may be transmitted from a network via a telecommunication line.

The memory 1002 is a computer readable recording medium and is configured, for example, with at least one of a Read Only Memory (ROM), an Erasable Programmable ROM (EPROM), an Electrically Erasable Programmable ROM (EEPROM), a Random Access Memory (RAM), and the like. The memory 1002 may be referred to as a register, cache, main memory, or the like. The memory 1002 may store programs (program codes), software modules, and the like that are capable of executing the method according to one embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 may include a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may have an integrated configuration (for example, a touch screen).

Devices such as the processor 1001 and the memory 1002 are connected by a bus 1007 for communicating information. The bus 1007 may be configured using a single bus or may be configured using different buses for each device.

Further, the device may be configured to include hardware such as a microprocessor, a Digital Signal Processor (DSP), an Application Specific Integrated Circuit (ASIC), a Programmable Logic Device (PLD), and a Field Programmable Gate Array (FPGA). Some or all of these functional blocks may be realized by means of this hardware. For example, the processor 1001 may be implemented by using at least one of the above-described items of hardware.

Further, the notification of the information is not limited to the mode/embodiment described in the present disclosure, and other methods may be used. For example, notification of information may be performed by physical layer signaling (e.g., Downlink Control Information (DCI), Uplink Control Information (UCI)), higher layer signaling (e.g., RRC signaling, Medium Access Control (MAC) signaling), broadcast information (a Master Information Block (MIB), a System Information Block (SIB)), other signals, or a combination thereof. The RRC signaling may also be referred to as an RRC message, for example, an RRC Connection Setup message, an RRC Connection Reconfiguration message, or the like.

Each of the above aspects/embodiments can be applied to at least one of Long Term Evolution (LTE), LTE-Advanced (LTE-A), SUPER 3G, IMT-Advanced, the 4th generation mobile communication system (4G), the 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and a next-generation system that is expanded based on these. Further, a plurality of systems may be combined and applied (for example, a combination of at least one of LTE and LTE-A with 5G).

The order of the processing procedures, sequences, flow-charts, and the like of each aspect/embodiment described in the present disclosure may be changed as long as there is no contradiction. For example, the methods described in this disclosure use an exemplary sequence to present the elements of the various steps and are not limited to the particular sequence presented.

The specific operation that is performed by a base station in the present disclosure may be performed by its upper node in some cases. In a network constituted by one or a plurality of network nodes having a base station, it is obvious that the various operations performed for communication with the terminal may be performed by at least one of the base station and other network nodes other than the base station (for example, an MME, an S-GW, and the like may be considered, but there is no limitation thereto). In the above, an example in which there is one network node other than the base station is explained; however, a combination of a plurality of other network nodes (for example, an MME and an S-GW) may be used.

Information and signals (information and the like) can be output from an upper layer (or lower layer) to a lower layer (or upper layer). These may be input and output via a plurality of network nodes.

The input/output information can be stored in a specific location (for example, a memory) or can be managed in a management table. The information to be input/output can be overwritten, updated, or added to. The information can be deleted after outputting. The inputted information can be transmitted to another device.

A determination may be made by using a value (0 or 1) represented by one bit, by using a Boolean value (true or false), or by comparison of numerical values (for example, comparison with a predetermined value).

Each of the aspects/embodiments described in the present disclosure may be used alone, in combination, or switched in accordance with the implementation. In addition, notification of predetermined information (for example, notification of "is X") is not limited to being performed explicitly, and it may be performed implicitly (for example, without notifying the predetermined information).

Whether referred to as software, firmware, middleware, microcode, hardware description language, or some other name, software should be interpreted broadly to mean instructions, an instruction set, code, a code segment, program code, a program, a subprogram, a software module, an application, a software application, a software package, a routine, a subroutine, an object, an executable file, an execution thread, a procedure, a function, and the like.

Further, software, instructions, information, and the like may be transmitted and received via a transmission medium. For example, when software is transmitted from a website, a server, or some other remote source by using at least one of a wired technology (a coaxial cable, a fiber optic cable, a twisted pair cable, a Digital Subscriber Line (DSL), or the like) and a wireless technology (infrared light, microwaves, or the like), then at least one of these wired and wireless technologies is included within the definition of the transmission medium.

Information, signals, or the like mentioned above may be represented by using any of a variety of different technologies. For example, data, an instruction, a command, information, a signal, a bit, a symbol, a chip, or the like that may be mentioned throughout the above description may be represented by a voltage, a current, an electromagnetic wave, a magnetic field or magnetic particles, an optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). A signal may also be a message. Further, "Component Carrier (CC)" may be referred to as "carrier frequency", "cell", "frequency carrier", or the like.

The terms "system" and "network" used in the present disclosure can be used interchangeably.

Furthermore, information, parameters, and the like explained in the present disclosure can be represented using an absolute value, can be expressed as a relative value from a predetermined value, or can be represented using corresponding other information. For example, a radio resource can be indicated using an index.

Names used for the above parameters are not restrictive names in any respect. In addition, formulas and the like using these parameters may be different from those explicitly disclosed in the present disclosure. Because the various channels (for example, a PUCCH, a PDCCH, or the like) and information elements can be identified by any suitable names, the various names assigned to these various channels and information elements shall not be restricted in any way.

In the present disclosure, terms such as "base station (Base Station: BS) ", "radio base station", "fixed station", "NodeB", "eNodeB (eNB) ", "gNodeB (gNB) ", "access point", "transmission point", "reception point", "transmission/reception point", "cell", "sector", "cell group", "carrier", "component carrier", and the like can be used interchangeably. A base station may also be referred to with a term such as a macro cell, a small cell, a femtocell, or a pico-cell.

The base station can accommodate one or a plurality of (for example, three) cells (also called sectors). In a configuration in which a base station accommodates a plurality of cells, the entire coverage area of the base station can be divided into a plurality of smaller areas. In each such smaller area, a communication service can be provided by a base station subsystem (for example, a small base station for indoor use (Remote Radio Head: RRH)).

The term "cell" or "sector" refers to part or all of the coverage area of a base station and/or a base station subsystem that performs a communication service in this coverage.

In the present disclosure, terms "mobile station (Mobile Station: MS) ", "user terminal", "user equipment (User Equipment: UE) ", "terminal", and the like can be used interchangeably.

A mobile station may be referred to by persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that at least one of a base station and a mobile station may be a device mounted on a moving body, a moving body itself, or the like. The mobile body may be a vehicle (for example, a car, plane, etc.), an unmanned mobile body (a drone, self-driving car, etc.), or a robot (manned or unmanned). At least one of a base station and a mobile station also includes a device that does not necessarily move during the communication operation. For example, at least one of a base station and a mobile station may be an Internet of Things (IoT) device such as a sensor.

"Base station" in the present disclosure may be substituted with "Mobile Station (user terminal, hereinafter the same) ". For example, each aspect/embodiment of the present disclosure may be applied to a configuration in which communication between a base station and a mobile station is replaced with communication between a plurality of mobile stations (for example, this may be called Device-to-Device (D2D), Vehicle-to-Everything (V2X), etc.). In this case, the mobile station may have the function of a base station. In addition, words such as "up" and "down" may be substituted with words corresponding to communication between terminals (for example, "side"). For example, "uplink channel", "downlink channel", or the like may be substituted with "side channel".

Similarly, "mobile station" in the present disclosure may be substituted with "base station". In this case, the base station may have the function of a mobile station.

A radio frame may be composed of one or a plurality of frames in a time domain. Each frame or frames in the time domain may be referred to as a subframe.

A subframe may be further configured by one or a plurality of slots in the time domain. The subframe may be a fixed time length (for example, 1 ms) independent of the numerology.

Numerology may be a communication parameter applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, a specific filtering process performed by a transceiver in a frequency domain, and a specific windowing process performed by a transceiver in a time domain.

A slot may be configured with one or a plurality of symbols (Orthogonal Frequency Division Multiplexing (OFDM) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or a plurality of symbols in a time domain. A minislot may also be called a subslot. A minislot may be composed of fewer symbols than slots. A PDSCH (or PUSCH) transmitted in time units greater than the minislot may be referred to as a PDSCH (or PUSCH) mapping type A. A PDSCH (or PUSCH) transmitted using a minislot may be referred to as PDSCH (or PUSCH) mapping type B.

Each of a radio frame, subframe, slot, minislot, and symbol represents a time unit for transmitting a signal. Different names may be used for a radio frame, subframe, slot, minislot, and symbol.

For example, one subframe may be called a Transmission Time Interval (TTI), a plurality of consecutive subframes may be called a TTI, and one slot or one minislot may be called a TTI. That is, at least one of the subframe and TTI may be a subframe (1 ms) in the existing LTE, may be a period shorter than 1 ms (for example, 1-13 symbols), or may be a period longer than 1 ms. Note that, a unit representing a TTI may be called a slot, a minislot, or the like instead of a subframe.

Here, a TTI refers to the minimum time unit of scheduling in radio communication, for example. For example, in the LTE system, the base station performs scheduling for allocating radio resources (a frequency bandwidth, a transmission power, etc. that can be used in each user terminal) to each user terminal in units of TTI. The definition of a TTI is not limited to this.

A TTI may be a transmission time unit such as a channel-encoded data packet (transport block), a code block, or a code word, or may be a processing unit such as scheduling or link adaptation. When a TTI is given, a time interval (for example, the number of symbols) in which a transport block, a code block, a code word, etc. are actually mapped may be shorter than the TTI.

When one slot or one minislot is called a TTI, one or more TTIs (that is, one or more slots or one or more minislots) may be the minimum scheduling unit. The number of slots (minislot number) constituting the minimum time unit of the scheduling may be controlled.

A TTI having a time length of 1 ms may be referred to as an ordinary TTI (TTI in LTE Rel. 8-12), a normal TTI, a long TTI, a normal subframe, a normal subframe, a long subframe, a slot, and the like. A TTI shorter than an ordinary TTI may be referred to as a shortened TTI, a short TTI, a partial TTI (partial or fractional TTI), a shortened subframe, a short subframe, a minislot, a subslot, a slot, and the like.

In addition, "long TTI" (for example, ordinary TTI, subframe, etc.) may be substituted with "a TTI having a time length exceeding 1 ms", and "short TTI" (for example, shortened TTI, etc.) may be substituted with "a TTI having a TTI length of less than the TTI length of a long TTI but a TTI length of 1 ms or more".

A Resource Block (RB) is a resource allocation unit in the time domain and frequency domain, and may include one or a plurality of consecutive subcarriers in the frequency domain. The number of subcarriers included in an RB may be the same regardless of the topology and may be, for example, twelve. The number of subcarriers included in an RB may be determined based on the numerology.

Also, the time domain of an RB may include one or a plurality of symbols, and may have a length of one slot, one minislot, one subframe, or one TTI. Each TTI, subframe, etc. may be composed of one or a plurality of Resource Blocks.

Note that, one or a plurality of RBs may be called a Physical Resource Block (Physical RB: PRB), a SubCarrier Group (SCG), a Resource Element Group (REG), a PRB pair, an RB pair, etc.

A resource block may be configured by one or a plurality of Resource Elements (RE). For example, one RE may be a radio resource area of one subcarrier and one symbol.

A Bandwidth Part (BWP) (which may be called a partial bandwidth, etc.) may represent a subset of consecutive common Resource Blocks (RBs) for certain numerology in a certain carrier. Here, a common RB may be specified by an index of an RB based on a common reference point of the carrier. A PRB may be defined in a certain BWP and numbered within that BWP.

A BWP may include a UL BWP and a DL BWP. One or a plurality of BWPs may be set in one carrier for a UE.

At least one of the configured BWPs may be active, and a UE may not expect to send and receive certain signals/channels outside the active BWP. Note that "cell", "carrier", and the like in this disclosure may be substituted with "BWP".

The above-described structures such as a radio frame, a subframe, a slot, a minislot, and a symbol are merely examples. For example, structures such as the number of subframes included in a radio frame, the number of slots per subframe or radio frame, the number of minislots included in a slot, the number of symbols and RBs included in a slot or minislot, the number of subcarriers included in an RB, and the number of symbols included in a TTI, a symbol length, and a Cyclic Prefix (CP) length can be changed in various manners.

The terms "connected", "coupled", or any variations thereof mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be substituted with "access". In the present disclosure, two elements can be "connected" or "coupled" to each other by using at least one of one or more wires, one or more cables, and one or more printed electrical connections, and as some non-limiting and non-exhaustive examples, by using electromagnetic energy having wavelengths in a radio frequency region, a microwave region, a light (both visible and invisible) region, or the like.

A Reference Signal may be abbreviated as an RS and may be called a Pilot in accordance with applicable standards.

As used in the present disclosure, the phrase "based on" does not mean "based only on" unless explicitly stated otherwise. In other words, the phrase "based on" means both "based only on" and "based at least on".

"Means" in the configuration of each device may be substituted with "unit", "circuit", "device", or the like.

Any reference to elements using a designation such as "first", "second", or the like used in the present disclosure generally does not limit the amount or order of those elements. Such designations can be used in the present disclosure as a convenient way to distinguish between two or more elements. Thus, reference to the first and second elements does not imply that only two elements can be adopted, or that the first element must precede the second element in some or other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include there being a plurality of the nouns following these articles.

As used in this disclosure, the terms "judging" and "determining" may encompass a wide variety of actions. "Judgment" and "decision" can include deeming that judging or deciding has been performed by, for example, judging, calculating, computing, processing, deriving, investigating, looking up, searching, inquiring (e.g., searching in a table, database, or other data structure), ascertaining, and the like. In addition, "judgment" and "decision" can include deeming that judging or deciding has been performed by receiving (for example, receiving information), transmitting (for example, transmitting information), inputting, outputting, and accessing (e.g., accessing data in a memory). In addition, "judgement" and "decision" can include deeming that judging or deciding has been performed by resolving, selecting, choosing, establishing, and comparing. That is, "judgment" and "decision" can include deeming that a "judgment" or "decision" regarding some action has been performed. Moreover, "judgment (decision)" may be substituted with "assuming", "expecting", "considering", or the like.

In the present disclosure, the wording "A and B are different" may mean "A and B are different from each other". It should be noted that the wording may mean "A and B are each different from C". Terms such as "separate", "couple", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
200 UE
210 Radio signal transmission and reception unit
220 Amplifier unit
230 Modulation and demodulation unit
240 Control signal and reference signal processing unit
250 Encoding/decoding unit
260 Data transmission and reception unit
270 Control unit
1001 Processor
1002 Memory
1003 Storage
1004 Communication device
1005 Input device

1006 Output device
1007 Bus

The invention claimed is:

1. A terminal comprising:

a transmitter that performs repetition transmission of an uplink signal in units of slots using an uplink shared channel for a repetition transmission type A of the uplink shared channel; and a processor that identifies specific slots of non-consecutive assigned as slots for the repetition transmission, based on a time-division multiplexing pattern configured for the terminal, wherein the transmitter performs the repetition transmission using the specific slots.

2. The terminal according to claim 1, further comprising:

a receiver that receives system information including an information element indicating the time-division multiplexing pattern.

3. The terminal according to claim 1, further comprising:

a receiver that receives a radio resource control message including an information element indicating the time-division multiplexing pattern.

4. The terminal according to claim 1, wherein the transmitter transmits a message including an information element relating to a capability of the repetition transmission using the specific slots.

5. A base station comprising:

a receiver that performs repetition reception of an uplink signal in units of slots using an uplink shared channel for a repetition transmission type A of the uplink shared channel; and a processor that assumes a terminal identifies specific slots of non-consecutive assigned as slots for the repetition reception, based on a time-division multiplexing pattern configured for the terminal, wherein the receiver performs the repetition reception using the specific slots.

6. A radio communication system comprising:

a terminal, and a base station, wherein the terminal comprises:

a transmitter that performs repetition transmission of an uplink signal in units of slots using an uplink shared channel for a repetition transmission type A of the uplink shared channel; and a processor that identifies specific slots of non-consecutive assigned as slots for the repetition transmission, based on a time-division multiplexing pattern configured for the terminal, wherein the transmitter performs the repetition transmission using the specific slots.

7. A radio communication method:

a step A of performing repetition transmission of an uplink signal in units of slots using an uplink shared channel for a repetition transmission type A of the uplink shared channel; and a step B of identifying specific slots of non-consecutive assigned as slots for the repetition transmission, based on a time-division multiplexing pattern configured for the terminal, wherein the step A includes a step of performing the repetition transmission using the specific slots.

* * * * *